United States Patent [19]

Narayan et al.

[11] Patent Number: 6,090,864

[45] Date of Patent: *Jul. 18, 2000

[54] POLYMERIC MDI PREPOLYMER COMPOSITION AND FLEXIBLE FOAMS PREPARED THEREFROM

[75] Inventors: Thirumurti Narayan, Grosse Ile; Gary E. Brant, Dearborn; Edward W. Cole, III, Grosse Ile, all of Mich.

[73] Assignee: BASF Corporation, Mt. Olive, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/845,737

[22] Filed: Apr. 25, 1997

[51] Int. Cl.$^7$ .................................................. C08G 18/04
[52] U.S. Cl. ......................... 521/159; 521/137; 521/160; 521/174; 528/59; 528/60; 528/67; 528/73; 528/76; 560/26; 560/359
[58] Field of Search ...................... 521/159, 160, 521/174, 137; 528/59, 60, 67, 73, 76; 560/26, 359

[56] References Cited

U.S. PATENT DOCUMENTS

| | | | |
|---|---|---|---|
| 4,031,026 | 6/1977 | Ibbotson . | |
| 4,251,639 | 2/1981 | Jarre et al. | 521/159 |
| 4,261,852 | 4/1981 | Carroll et al. . | |
| 5,070,114 | 12/1991 | Watts et al. . | |
| 5,122,548 | 6/1992 | Broos et al. | 521/174 |
| 5,491,252 | 2/1996 | Narayan et al. | 521/159 |
| 5,494,941 | 2/1996 | Lutter et al. | 521/159 |
| 5,532,403 | 7/1996 | Narayan et al. | 521/159 |
| 5,591,779 | 1/1997 | Bleys et al. | 521/159 |
| 5,594,039 | 1/1997 | Gerber et al. | 521/159 |

*Primary Examiner*—John M. Cooney, Jr.
*Attorney, Agent, or Firm*—Fernando A. Borrego

[57] ABSTRACT

The present invention relates to prepolymers, comprising (a) a polymethylene polyphenylene polyisocyanate; and
(b) a polyether polyol having an average hydroxyl equivalent weight of at least about 700;

wherein the resulting prepolymer has an average viscosity of between about 400 to about 2000 centipoise at 25° C. The prepolymer is useful, for example, for the production of polyurethane foams and, more particularly, to medium density flexible foams having superior flow characteristic and fast demold times.

27 Claims, No Drawings

POLYMERIC MDI PREPOLYMER COMPOSITION AND FLEXIBLE FOAMS PREPARED THEREFROM

FIELD OF THE INVENTION

The present invention relates to prepolymer compositions, and more particularly to polymethylene polyphenylene polyisocyanate based prepolymer compositions and the flexible foams produced employing such prepolymers.

BACKGROUND OF THE INVENTION

Prepolymer compositions per se have been utilized for years in association with polyols in the presence of catalysts and blowing agents to manufacture polyurethane foams. In general, such prepolymers have been formulated with the objective of enhancing storage stability, controlling shrinkage and improving the open cell count of the resulting foams. However, many of the known prepolymer based compositions fail to address problems associated with less than desirable flow characteristics and demold times.

SUMMARY OF THE INVENTION

Accordingly, the present invention relates to prepolymers useful, for example, in the production of polyurethane foams wherein the resulting foams have improved flow characteristics and demold capabilities, among other advantages over other known foams. The prepolymer generally comprises a polymethylene polyphenylene polyisocyanate and a polyether polyol having an average hydroxyl equivalent weight of at least about 700, wherein the resulting prepolymer has an average viscosity of between about 400 to about 2000 centipoise at 25° C.

The present invention also relates to polyurethane foams comprising:

a) a prepolymer comprising a polymethylene polyphenylene polyisocyanate and a polyether polyol, wherein the resulting prepolymer has an average viscosity of between about 400 to about 2000 centipoise at 25° C.; and b) an isocyanate reactive resin component.

In general, it is contemplated that the prepolymer compositions of the present invention can be employed under any application where medium density flexible foams are to be used. As should be understood by those skilled in the art, the phrase "isocyanate reactive resin component" is intended to mean a polyol, a urethane-promoting catalyst, a blowing agent, and optionally a surfactant, chain extender, flame inhibitor, cell openers and antioxidants among other commonly employed additives, generally.

The present invention also relates to the method of preparing both the prepolymers and the polyurethane foams which employ the prepolymers.

DETAILED DESCRIPTION OF THE PREFERRED EMBODIMENT

The prepolymers of the present invention can be used to form a variety of commercial products, including but not limited to, foams used in compact disc containers, for example.

The prepolymers of the present invention are prepared by reacting a polymethylene polyphenylene polyisocyanate (otherwise referred to herein as polymeric MDI) with a polyether polyol under certain reaction conditions as will be described in greater detail below. The polymeric MDI employed is typically made by the phosgenation of a mixture of polyamines obtained by acid condensation of aniline and formaldehyde. The acid condensation of aniline and formaldehyde yields a reaction product composed of diamiodiphenylmethane along with polymethylene polyphenyl polyamines having functionalities of 3 or greater, known as higher oligomers. The polymethylene polyphenyl polyamines are then phosgenated to give rise to polymeric MDI. The polymeric MDI may be in crude form or in a modified form resulting from the removal of some diisocyanate through distillation or crystallization.

The polymeric MDI of the present invention is in general a mixture of polymethylene polyphenyl polyisocyanate isomers, diphenylmethane diisocyanate isomers, triisocyanates, and other higher functional oligomers. Preferably, the polymeric MDI of the present invention contains from about 40.0 weight percent to about 70.0 weight percent polymethylene polyphenyl polyisocyanate having functionalities greater than two, more preferably from about 50.0 weight percent to about 60.0 weight percent, and still more preferably from about 52.0 to about 56.0 weight percent, the remainder comprising diphenylmethane diisocyanate. The diphenylmethane diisocyanate in the polymeric MDI may include one or more isomers selected from 2,4' and 4,4' MDI isomers wherein the total amount of 2,4' MDI is 10.0 weight percent or less based on the total weight of polymeric MDI. Preferably, the amount of 2,4' MDI included in the polymeric MDI will be from about 1.0 weight percent to about 10.0 weight percent, more preferably from about 2.0 weight percent to about 8.0 weight percent, and still more preferably from about 3.0 weight percent to about 6.0 weight percent.

For the preferred embodiment of the prepolymer, the polymeric MDI is present in an amount of between about 80.0 to about 90.0 weight percent based on the total weight of the prepolymer and has an average viscosity of about 160 to about 250 centipoise at 25° C. However, it is to be understood that the present invention is not limited to this weight percent of the polymeric MDI, but includes levels where the polymeric MDI is present in an amount of at least about 65.0 weight percent based on the total weight of the prepolymer.

The polyether polyol component of the prepolymer of the present invention is preferably a polyoxyalkylene polyether polyol produced, for example, by the base catalyzed addition of an alkylene oxide to an initiator molecule containing an average of two or more active hydrogens, such as polyhydrin alcohol.

Examples of alkylene oxide include ethylene oxide, propylene oxide, butylene oxide, amylene oxide, mixtures thereof, tetrahydrofuran, alkylene oxide-tetrahydrofuran mixtures, epihalohydrins, and aralkylene oxides such as styrene oxide. Suitable initiators include both aliphatics and aromatics, such as ethylene glycol, propylene glycol, dipropylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, a-methyl glucoside, pentaerythritol, and sorbitol. Also included with the term "polyhydric alcohol" are compounds derived from phenol such as 2,2-bis(4-hydroxyphenyl)propane, commonly known as Bisphenol A.

The polyoxyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-oxybutylene and polyoxyethylene glycols, and random copolymer glycols prepared from blends of two or more alkylene oxides or by the sequential addition of two or more alkylene oxides. The polyoxyalkylene polyether polyols may be prepared by any known process such as, for example, the process disclosed by Wurtz in 1859 and *Encyclopedia of Chemical Technology*, Vol. 7, pp. 257–262, published by Interscience Publishers, Inc. (1951) or in U.S. Pat. No. 1,922,459.

Polyethers which are preferred include the alkylene oxide addition products of trimethyolpropane, glycerine, propylene glycol, dipropylene glycol, and 2,2'-(4,4'-hydroxyphenyl)propane and mixtures of diols and triols such as propylene glycol-glycerine blends.

Alkylene oxides which are preferred are ethylene oxide and propylene oxide or mixtures thereof reacting with the initiator molecule to make polyoxyalkylene polyether polyols having predominately polyoxypropylene groups with from 0 to about 30.0 percent by weight polyoxyethylene groups as an end cap, a block, or heteric, preferably as a cap.

The polyether polyols of the invention have a relatively higher average molecular weight, ranging from about 700 to about 10,000, preferably from about 700 to about 6,000, with average functionalities from 1.6 to about 3, preferably from 2.4 to 3.

The amount of polyether polyol reacted with the polymeric-MDI is an amount effective to suitably adjust the free NCO content of the prepolymer. Preferred amounts of polyether polyol include about 10.0 weight percent to about 20.0 weight percent, based on 100 parts by weight of the prepolymer. Again, it is to be understood that the present invention is not limited to this weight percent of the polyether polyol, but includes levels where the polyether polyol is present in an amount of about 35.0 weight percent or less based on the total weight of the prepolymer. The overall free NCO content of the prepolymer is preferably about 20.0 to about 30.0 weight percent, more preferably from about 24.0 to 28.0 weight percent.

Thus, the resulting prepolymer in accordance with the teachings of the present invention will preferably have the following ranges of constituents: a) from about 2.0 to about 4.0 weight percent 2,4'-methylene bis (phenylisocyanate), b) from 25.0 to about 35.0 weight percent 4,4'-methylene bis (phenylisocyanate), c) from about 12.0 to about 16.0 weight percent 3 ring MDI oligomer and d) from 10.0 to about 35.0 weight percent of the isocyanate reactive resin component, i.e., including components having isocyanate terminated urethane moieties.

Upon formation of the desired prepolymer, the prepolymer may be added to the isocyanate reactive resin component comprised of a polyol, a urethane-promoting catalyst, a blowing agent, and optionally a surfactant, chain extender, flame inhibitor, cell openers and antioxidants among other commonly employed additives, generally.

Polyols which may be employed for the preparation of polyurethane foams and elastomers are well known to those skilled in the art. They are often prepared by the catalytic condensation of an alkylene oxide or mixture of alkylene oxides either simultaneously or sequentially with an organic compound having at least two active hydrogen atoms, such as evidenced by U.S. Pat. Nos. 1,922,459; 3,190,927; and 3,346,557. Representative polyols include polyhydroxyl-containing polyesters, polyoxyalkylene polyether polyols such as the aforementioned polyoxyalkylene polyether polyols, polyhydroxy-terminated polyurethane polymers, polyhydroxyl-containing phosphorous compounds, and alkylene oxide adducts of polyhydric polythioesters, polyacetals, aliphatic polyols and thiols, ammonia, and amines including aromatic, aliphatic, and heterocyclic amines, as well as mixtures thereof. Alkylene oxide adducts of compounds which contain two or more different groups within the above-defined classes may also be used, for example, amino alcohols which contain an amino group and a hydroxyl group. Also, alkylene oxide adducts of compounds which contain one SH group and one OH group as well as those which contain an amino groups and an SH group may be used. Generally, equivalent weight of the polyols will vary from 100 to 10,000, preferably from 250 to 3,000.

Any suitable hydroxy-terminated polyester may be used such as are prepared, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, a-hydromuconic acid, β-hydromuconic acid, a-butyl-a-ethyl-glutaric acid, a, β-diethylsuccinic acid, isophthalic acid, terephthalic acid, hemimellitic acid, and 1, 4-cyclohexanedicarboxylic acid. Any suitable polyhydric alcohol, including both aliphatic and aromatic, may be used such as ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, a-methyl glucoside, pentaerythritol, and sorbitol. Also included within the term "polyhydric alcohols" are compounds derived from phenol such as 2,2-bis(4-hydroxylphenyl)propane, commonly known as Bisphenol A. Preferred are diols and triols for the manufacture of flexible polyurethane foams.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Any suitable polyoxyalkylene polyether polyol may be used such as the polymerization product of an alkylene oxide or a mixture of alkylene oxides with a polyhydric alcohol. Any suitable polyhydric alcohol may be used such as those disclosed above for use in the preparation of the hydroxy-terminated polyesters. Any suitable alkylene oxide may be used such as those disclosed above for preparing the prepolymers. Polyethers which are preferred include the alkylene oxide addition products of trimethylolpropane, glycerine, propylene glycol, dipropylene glycol, and 2,2'-(4,4'-hydroxyphenyl)propane and blends thereof having equivalent weights of from 100 to 5,000.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether glycol.

Polyhydroxyl-containing phosphorous compounds which may be used include those compounds disclosed in U.S. Pat.

No. 3,639,542. Preferred polyhydroxyl-containing phosphorous compounds are prepared from alkylene oxides and acids of phosphorous having an acid equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing at least two —SH groups such as 1,2-ethanedithiol, 1,2-propanedithiol, 1,3-propanedithiol, and 1,6-hexanedithiol; alkene thiols such as 2-butene-1,4-dithiol; and alkyne thiols such as 3-hexyne-1,6-dithiol.

Suitable amines which may be condensed with alkylene oxides include aromatic amines such as aniline, o-chloroaniline, p-aminoaniline, 1,5-diaminonaphthalene, methylene dianiline, the condensation products of aniline and formaldehyde, and 2,3-, 2,6-, 3,4-, 2,5-, and 2,4-diaminotoluene; aliphatic amines such as methylamine, triisopropanolamine, ethylenediamine, 1,3-diaminopropane, 1,3-diaminobutane, and 1,4-diaminobutane.

Also, polyols containing ester groups can be employed in the subject invention. These polyols are prepared by the reaction of an alkylene oxide with an organic dicarboxylic acid anhydride and a compound containing reactive hydrogen atoms. A more comprehensive discussion of these polyols and their method of preparation can be found in U.S. Pat. Nos. 3,585,185; 3,639,541 and 3,639,542.

Polyols containing graft polymer dispersions may also be employed in the invention. These are prepared by the in situ polymerization, in the polyols listed below, of an ethylenically unsaturated monomer or a mixture of ethylenically unsaturated monomers. Representative ethylenically unsaturated monomers which may be employed in the present invention include butadiene, isoprene, 1,4-pentadiene, 1,6-hexadiene, 1,7-octadiene, styrene, a-methylstyrene, 2-methylstyrene, 3-methylstyrene and 4-methylstyrene, 2,4-dimethylstyrene, ethylstyrene, isopropylstyrene, butylstyrene, phenylstyrene, cyclohexylstyrene, benzylstyrene, and the like; substitute styrenes such as cyanostyrene, nitrostyrene, N,N-dimethylaminostyrene, acetoxystyrene, methyl 4-vinylbenzoate, phenoxystyrene, p-vinylphenyl oxide, and the like; the acrylic and substituted acrylic monomers such as acrylonitrile, acrylic acid, methacrylic acid, methyl acrylate, 2-hydroxyethyl acrylate, methyl methacrylate, cyclohexyl methacrylate, benzyl methacrylate, isopropyl methacrylate, octyl methacrylate, methacrylonitrile, ethyl a-ethoxyacrylate, methyl a-acetaminoacrylate, butyl acrylate, 2-ethylhexyl acrylate, phenyl acrylate, phenyl methacrylate, N,N-dimethylacrylamide, N,N-dibenzylacrylamide, N-butylacrylamide, methacrylyl formamide, and the like; the vinyl esters, vinyl ethers, vinyl ketones, etc., such as vinyl acetate, vinyl butyrate, isopropenyl acetate, vinyl formate, vinyl acrylate, vinyl methacrylate, vinyl methoxyacetate, vinyl benzoate, vinyltoluene, vinylnaphthalene, vinyl methyl ether, vinyl ethyl ether, vinyl propyl ethers, vinyl butyl ethers, vinyl 2-ethylhexyl ether, vinyl phenyl ether, vinyl 2 methoxyethyl ether, methoxybutadiene, vinyl 2-butoxyethyl ether, 3,4-dihydro-1,2-pyran, 2-butoxy-21-vinyloxy diethyl ether, vinyl methyl ketone, vinyl ethyl ketone, vinyl phosphonates such as vinyl phenyl ketone, vinyl ethyl sulfone, N-methyl-N-vinyl acetamide, N-vinyl-pyrrolidone, vinyl imidazole, divinyl sulfoxide, divinyl sulfone, sodium vinylsulfonate, methyl vinylsulfonate N-vinyl pyrrole, and the like; dimethyl fumarate, dimethyl maleate, maleic acid, crotonic acid, fumaric acid, itaconic acid, monomethyl itaconate, t-butylaminoethyl methacrylate, dimehtylaminoethyl methacrylate, glycidyl acrylate, allyl alcohol, glycol monoesters of itaconic acid, vinyl pyridine, and the like. Any of the known polymerizable monomers can be used and the compounds listed above are illustrative and not restrictive of the monomers suitable for use in this invention. Preferably, the monomer is selected from the group consisting of acrylonitrile, styrene and mixtures thereof.

The amount of ethylenically unsaturated monomer employed in the polymerization reaction is generally from about 25.0 percent to about 70.0 percent, preferably from about 30.0 percent to about 45.0 percent, based on the total weight of the product. The polymerization occurs at a temperature between about 25° C. and 180° C., preferably from 80° C. to 135° C.

The unsaturated polyols or macromers which may be employed in preparing the graft polymer dispersion may be prepared by the reaction of any conventional polyol such as those described above with an organic compound having both ethylenic unsaturation and a hydroxyl, carboxyl, anhydride, isocyanate or epoxy group or they may be prepared by employing an organic compound having both ethylenic unsaturation and a hydroxyl, carboxyl, anhydride, or epoxy group as a reactant in the preparation of the conventional polyol. Representative of such organic compounds include unsaturated mono- and polycarboxylic acids and anhydrides such as maleic acid and anhydride, fumaric acid, crotonic acid and anhydride, propenyl succinic anhydride, acrylic acid, acryloyl chloride, hydroxy ethyl acrylate or methacrylate and halogenated maleic acids and anhydrides, unsaturated polyhydric alcohols such as 2-hutene-1,4-diol, glycerol allyl ether, trimethylolpropane allyl ether, pentaerythritol allyl ether, pentaerythritol vinyl ether, pentaerythritol diallyl ether, pentaerythritol vinyl ether, pentaerythritol diallyl ether, and 1-hutene-3,4-diol, unsaturated epoxides such as 1-vinyl-cyclohexene-3,4-epoxide, butadiene monoxide, vinyl glycidyl ether(1-vinyloxy-2,3-epoxy propane), glycidyl methacrylate and 3-allyloxypropylene oxide (allyl glycidyl ether). If a polycarboxylic acid or anhydride is employed to incorporate unsaturation into the polyols, it is preferable to react the unsaturated polyol with an alkylene oxide, preferably ethylene or propylene oxide, to replace the carboxyl groups with hydroxyl groups prior to employment in the present invention. The amount of alkylene oxide employed is such as to reduce the acid number of the unsaturated polyol to about 5.0 or less.

Illustrative polymerization initiators which may be employed are the well-known free radical types of vinyl polymerization initiators such as the peroxides, persulfates, perborates, percarbonates, azo compounds, etc. These include hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramenthane hydroperoxide, diacetyl peroxide, di-a-cumyl peroxide, dipropyl peroxide, diisopropyl peroxide, isopropyl-t-butyl peroxide, butyl-t-butyl peroxide, difuroyl peroxide, bis(triphenylmethyl) peroxide, bis(p-methoxybenzoyl) peroxide, p-monomethoxybenzoyl peroxide, rubene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-decalin hydroperoxide, a-methylbenzyl hydroperoxide, a-methyl-a-ethyl benzyl hydroperoxide, tetralin hydroperoxide, triphenylmethyl hydroperoxide, diphenylmethyl hydroperoxide, a,al-azobis-(2-methyl heptonitrile), 1,1'-azo-bis(cyclohexane carbonitrile), 4,4'-azobis (4-cyanopentanoic acid), 2, 21-azobis (isobutyronitrile), 1-t-butylazo-i-cyanocyclohexane, persuccinic acid, diisopropyl peroxy dicarbonate, 2,2'-azobis(2,4-dimethylvaleronitrile), 2-t-butylazo-2-cyano-4-methoxy-4-methylpentane,2,21-azobis-2-meth ylbutanenitrile, 2-t-butylazo-2-cyanobutane, 1-t-amylazo-1-cyanocyclohexane, 2,2'-azobis(2,4-dimethyl-4-methoxyvaleronitrile, 2,2'-azobis-2-methylbutyronitrile, 2-t-butylazo-2-cyano-4-methylpentane, 2-t-butylazo-2-isocutyronitrile, to butylperoxyisopropyl carbonate and the like; a mixture of initiators may also be used. The preferred initiators are 2,2'-azobis(2-methylbutyronitrile), 2,2'-azobis (isobutyronitrile), 2,2'-azobis (2,4-dimethylvaleronitrile), 2-t-butylazo-2-cyano-4-methoxy-4-methylpentane, 2-t-butylazo-2-cyano-4-methylpentane, 2-t-butylazo-2-cyano-butane and lauroyl peroxide. Generally, from about 0.1 percent to about 10.0 percent, preferably from about 1.0 percent to about 4.0 percent, by weight of initiator based on the weight of the monomer will be employed in the process of the invention.

Another feature of the process according to this invention is the use of relatively low amounts of water, which reacts with the isocyanate mixture and provides carbon dioxide, as blowing agent. Importantly, the water content of the polyol component employed for the production of the above described prepolymers should be less than about 0.05 weight percent based on the total weight of the polyol component. Preferably, between about 0.05 weight percent to about 3.0 weight percent, and in particular between about 1.0 weight percent to about 2.0 weight percent, based on the weight of the polyol, of water is used. Instead of water alone, optionally mixtures of water and chemically inert, low-boiling, halogenated hydrocarbons can also be used as foaming agents. These include, for instance, halogenated hydrocarbons having boiling points below 50° C., preferably between −50° C. and 30° C. at atmospheric pressure. The following listing is used as an example: halogenated hydrocarbons such as monochlorodifluoromethane, dichloromonofluoromethane, dichlorofluoromethane, and trichlorofluoromethane and their mixtures, and hydrocarbons such as propane, n-butane, and isobutane as well as dimethyl ether. Suitable mixtures of water and halogenated hydrocarbons generally consist of between about 5.0 to about 70.0 percent by weight, preferably between about 10.0 to about 50.0 percent by weight, of water and between about 30.0 to about 95.0 percent by weight, preferably between about 50.0 to 90.0 percent by weight, of halogenated hydrocarbons, with the percent by weight being based on the total weight of the blowing agent employed.

The required quantities of blowing agent can be determined experimentally in a very simple manner as a function of the mixing ratio of water to halogenated blowing agents as well as the desired density of the foam.

It may be appropriate to use chain-extending agents. Chain-extending agents which may be employed in the preparation of the polyurethane foams include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water, ethylene glycol, 1,4-butanediol and primary and secondary diamines which react more readily with the prepolymer than does water such as phenylene diamine, 1,4-cyclohexane-bis-(methylamine), ethylenediamine, diethylenetriamine, N-(2-hydroxypropyl) ethylenediamineN,NI-di(2-hydroxypropyl) ethylenediamine, piperazine, and 2-methylpiperazine.

Any suitable catalyst may be used including tertiary amines such as, for example, triethylenediamine, N-methylmorpholine, N-ethylmorpholine, diethylethanolamine, N-cocomorpholine, 1-methyl-4-dimethylaminoethylpiperazine 3-methoxypropyldimethylamine, N,N,NI-trimethylisopropylpropylenediamine, 3-diethylaminopropyldiethylamine, dimethylbenzylamine, and the like. Other suitable catalysts are, for example, stannous chloride, dibutyltin di-2-ethyl hexanoate, stannous oxide, as well as other organometallic compounds such as are disclosed in U.S. Pat. No. 2,846,408.

A surface-active agent is generally necessary for production of high grade polyurethane foam according to the present invention, since in the absence of same, the foams generally collapse or contain very large uneven cells. Numerous surface-active agents have been found satisfactory. Nonionic surface-active agents are preferred. Of these, the nonionic surface-active agents such as the well-known silicones have been found particularly desirable. Other surface-active agents which are operative, although not preferred, include paraffin oils, castor oil, turkey red oil, polyethylene glycol ethers of long chain alcohols tertiary amine or alkanolamine salts of long chain alkyl acid sulfate esters, alkyl sulfonic esters, and alkyl arylsulfonic acids.

Among the flame retardants which may be employed are pentabromodiphenyl oxide, dibromopropanol, tris(β-chloropropyl)phosphate, 2,2-bis(bromoethyl) 1,3-propanediol, tetrakis(2-chloroethyl)ethylene diphosphate, tris (2,3-dibromopropyl) phosphate, tris (β-chloroethyl) phosphate, tris(1,2-dichloropropyl)phosphate, bis-(2-chloroethyl) 2-chloroethylphosphonate, molybdenumtrioxide, ammoniummolybdate, ammonium phosphate, pentabromodiphenyloxide, tricresyl phosphate, hexabromocyclododecane, melamine, and dibromoethyldibromocyclohexane. The concentrations of flame retardant compounds which may be employed range from 5.0 to 25.0 parts per 100 parts of polyol mixture.

Further details concerning the above-mentioned other commonly used auxiliaries and additives are contained in the literature, for instance, in the monograph by J. H. Saunders and K. C. Frisch, "High Polymers," Volume XVI, Polyurethanes, Part 1 and 2, Interscience Publishers, 1962 and 1964.

The method of manufacturing the prepolymer according to the invention proceeds by heating the polymeric MDI from about 40° C., to less than about 100° C., preferably from about 65° C. to about 85° C.; while maintaining the temperature, charging the polyol component to the blend preferably at a constant rate over a period of about one (1) hour; and while continuing to maintain the temperature, allowing the contents to react over a period of 1 to 5 hours or until the desired NCO content is attained after which the reaction product is allowed to cool. If temperatures in excess of about 100° C. are used in the reaction, the polyol tends to excessively react with three-ringed and higher ringed oligomers, if present, thereby resulting in excessive crosslinking reactions.

The procedure can be carried out in the absence of a reaction scavenger or deactivator like the ones mentioned in U.S. Pat. No. 4,738,991, since the polymeric-MDI generally contains a sufficient amount of residual acid left over from the phosgenation of MDA and polymeric-MDA to stabilize the prepolymer.

Upon formation of the prepolymer, the prepolymer side and the isocyanate reactive resin component may be mixed at temperatures from 15° C. to 90° C., preferably at tank temperatures from 20° C. to 35° C., and may be poured or sprayed into an open mold which is subsequently optionally closed, or may be injected at high pressures into a closed mold. The mixing can be performed mechanically by means of a stirrer or under high pressure by the impingement method. The mold temperature should be 20° C. to 60° C., preferably 25° C. to 50° C. Preferably, the ratios of prepolymer to isocyanate reactive resin components will be on the order of 0.85:1 to about 1:0.85.

The following examples illustrate the nature of the invention. For those foams processed by machine, generally, the prepolymer is mixed with the resin side component under the following processing parameters:

| Metering Equipment: | Low Pressure |
|---|---|
| Mix Head: | Mechanical |
| Component Temperatures: | 25° C., Resin |
|  | 25° C., Prepolymers |
| Index | 90–115 |
| Injection Rate: | 20 g/sec. |

The following list of ingredients were employed to make the prepolymer according to the invention and foams prepared thereby:

Polyol A is a polyoxyethylated polyoxypropylated glycerine having a hydroxyl number of 27.5 and a viscosity of 1329 CPS at 25° C.

Polyol B is a polyoxyethylated polyoxypropylated glycerine of having a hydroxyl number of 35 and a viscosity of 830 CPS at 25° C.

Polyol C is a 1:1 acrylonitrile:styrene copolymer constituting 30.0 weight percent solids dispersed in oxyethylated oxypropylated trimethylolpropane having a hydroxyl number of 35. The hydroxyl number of Polyol C is 25 and the viscosity is 3200 CPS at 25° C.

Polyisocyanate A is a polymeric MDI having about 40.0 weight percent 4,4' MDI and about 3.0 weight percent 2,4' MDI for a total of 43.0 weight percent two-ring content, having an NCO content of 31.5 weight percent.

Catalyst A (XE-8510) is a proprietary amine catalyst sold by Air Products.

Catalyst B (DABCO 8800) is a propriertary amine catalyst sold by Air Products.

Surfactant A (B 4113) is a silicone surfactant available from Goldschmidt.

EXAMPLE

Prepolymer

A polyurethane prepolymer in accordance with the teachings of the present invention was produced in the following manner. 3311.8 parts of Polyisocyanate A was placed in a reaction nitrogen purged vessel equipped with heating and agitating means. Stirring was commenced and the contents of the vessel was heated to 60° C. 388.2 parts of Polyol A was added at a constant rate over a period of 30 minutes. After the polyol addition was completed, the reaction contents were heated to 80° C. and maintained for 60 minutes.

A sample of this composition was taken and it was determined to have a free NCO content of 27.8 which indicated that the reaction was completed. The sample was then stored in nitrogen purged shipping containers. The viscosity of the product was then measured and found to be 584 centipoises at 25° C. Additionally, the sample was further characterized by High Pressure Liquid Chromatography (HPLC). The HPLC analysis indicated that the composition consisted of 3.52% 2,4'-MDI isomer, 35.26% 4,4'-MDI isomer, 16.0% three ring isomer, 12–32% of the composition were components having isocyanate terminated urethane moieties and the amount of MDI oligomers higher than three ring oligomers was determined to be 32.9%, all percentages being by weight.

Isocyanate Reactive Resin Component

The isocyanate reactive resin component consisted of the following:

| POLYOL B = | 52.0 |
|---|---|
| POLYOL C = | 42.8 |
| 1,4-Butanediol = | 2.0 |
| Catalyst A = | 0.8 |
| Catalyst B = | 0.2 |
| Diethanolamine = | 0.8 |
| Surfactant A = | 0.8 |
| Water = | 1.2 | all parts being parts by weight of the resin component.

The above described prepolymer and isocyanate reactive resin component were processed at 100 index by a low pressure foaming equipment under the ambient temperature conditions in an unheated mold at a ratio of approximately 1:1. The flow of the foaming mixture throughout was found to be excellent and the foamed parts were demolded in 2.5 to 3 minutes and were also superior to what is known in the art. The foams produced displayed the following properties which are specifically required for the use recited in the present invention.

| Test | Units | Avg. Value of 4 tests |
|---|---|---|
| Core density | lbs/cu. ft | 13.6 |
| Section Density | lbs/cu ft | 13.8 |
| Original peak tensile strength | PSI | 39.5 |
| Original break elongation | % | 60 |
| Original Graves Tear strength | PIP | 6.7 |
| Orig./Orig. humid aged at 25% CFD | PSI | 13.7 |
| Orig./Orig. humid aged 50% CFD | PSI | 22.4 |

Preferably, the resulting foams will have an average density ranging from about 8.0 lbs./cu.ft. to about 20.0 lbs/cu.ft. Other suitable processes for the preparation of cellular polyurethane products are additionally disclosed in U.S. Pat. No. RE 24,514, the disclosure of which is hereby expressly incorporated by reference.

While it will be apparent that the preferred embodiments of the invention disclosed are well calculated to fulfill the object stated, it will be appreciated that the invention is susceptible to modification, variation and change without departing from the spirit thereof.

What is claimed is:

1. A prepolymer composition comprising the reaction product of:
   a) a polyisocyanate component consisting of polymethylene polyphenylene polyisocyanates, wherein from 40 to 70 weight percent of said polymethylene polyphenylene polyisocyanates have functionalities greater than 2 and the remainder of said polymethylene polyphenylene polyisocyanates have functionalities of 2 or less; and
   b) a polyether polyol component having an average hydroxyl equivalent weight of at least about 700 and an average functionality of from 1.6 to 3.0;
   c) wherein said polyisocyanate component is combined in an amount of from 65 to 90 weight percent based on the total weight of said prepolymer composition with an amount of from 10 to 35 weight percent of said polyol component based on the total weight of said prepolymer composition, and the resulting prepolymer has an average viscosity of from about 400 to about 2,000 centipoise at 25° C. and a free NCO content of from 20 to 30 weight percent.

2. The prepolymer composition of claim 1 wherein said polyisocyanate component has an average viscosity of between about 160 to about 250 centipoise at 25° C.

3. The prepolymer composition of claim 1 wherein said polyisocyanate component is present in an amount of about 80.0 to about 90.0 weight percent based on the total weight of the prepolymer composition.

4. The prepolymer composition of claim 1 wherein from about 50.0 to about 60.0 weight percent of said polymethylene polyphenylene polyisocyanates have functionalities greater than two based on the total weight of said polyisocyanate component.

5. The prepolymer composition of claim 1 wherein from about 52.0 to about 56.0 weight percent of said polymethylene polyphenylene polyisocyanates have functionalities greater than two based on the total weight of said polyisocyanate component.

6. The prepolymer composition of claim 1 wherein said polyisocyanate component includes one or more isomers selected from the group consisting of 2,4' and 4,4' diphenylmethane diisocyanate isomers, wherein the total amount of 2,4' diphenylmethanediisocyanate is about 10.0 weight percent or less based on the total weight of said polyisocyanate component.

7. The prepolymer composition of claim 6 wherein said polyisocyanate component includes between about 2.0 to about 8.0 weight percent of said 2,4'-diphenylmethane diisocyanate isomer based on the total weight of said polyisocyanate component.

8. A prepolymer composition prepared by the process of reacting:
   a) a polyisocyanate component consisting of polymethylene polyphenylene polyisocyanates, wherein from 40 to 70 weight percent of said polymethylene polyphenylene polyisocyanates have functionalities greater than 2, from 10 to 1 weight percent of said polymethylene polyphenylene polyisocyanates are 2,4' diphenylmethane diisocyanate and the remainder of said polymethylene polyphenylene polyisocyanates have functionalities of 2 or less; and
   b) a polyether polyol component having an average hydroxyl equivalent weight of at least about 700 and an average functionality of from 1.6 to 3.0;
   wherein said polyisocyanate component is combined in an amount of from 65 to 90 weight percent based on the total weight of said prepolymer composition with an amount of from 10 to 35 weight percent of said polyether polyol component based on the total weight of said prepolymer composition, and the resulting prepolymer has an average viscosity of from about 400 to about 2,000 centipoise at 25° C. and a free NCO content of from 20 to 30 weight percent.

9. The prepolymer composition of claim 8 wherein said polyisocyanate component has an average viscosity of between about 160 to 250 centipoise at 25° C.

10. The prepolymer composition of claim 8 wherein said polyisocyanate component includes from about 52.0 to about 56.0 weight percent polymethylene polyphenylene polyisocyanates having average functionalities greater than two based on the total weight of said polyisocyanate component.

11. The prepolymer composition of claim 8 wherein said polyisocyanate component includes from about 2.0 weight percent to about 8.0 weight 2,4'-diphenylmethane diisocyanate based on the total weight of said polyisocyanate component.

12. A process for making a liquid polyisocyanate prepolymer comprising the steps of:
   a) providing a polyisocyanate component consisting of polymethylene polyphenylene polyisocyanates, wherein from 40 to 70 weight percent of said polymethylene polyphenylene polyisocyanates have functionalities greater than 2 and the remainder of said polymethylene polyphenylene polyisocyanates have functionalities of 2 or less; and
   b) reacting a polyether polyol component having an average hydroxyl equivalent weight of at least 700 and an average functionality of from 1.6 to 3.0 with said polyisocyanate component at temperatures of less than about 100° C.;
   c) wherein said polyisocyanate component is combined in an amount of from 65 to 90 weight percent based on the total weight of said prepolymer composition with an amount of from 10 to 35 weight percent of said polyether polyol component based on the total weight of said prepolymer composition, and the resulting prepolymer has an average viscosity of between about 400 to about 2,000 centipoise at 25° C.

13. The process of claim 12 wherein said polyisocyanate component has an average viscosity of from about 160 to about 250 centipoise at 25° C.

14. The process of claim 12 wherein said polyisocyanate component is present in an amount of about 80.0 to about 90.0 weight percent based on the total weight of the prepolymer.

15. The process of claim 12 wherein said prepolymer has an average NCO content of between about 20.0 to 30.0 weight percent.

16. The process of claim 12 wherein said polyisocyanate component includes one or more isomers selected from the group consisting of 2,4' and 4,4' diphenylmethane diisocyanate isomers, wherein the total amount of 2,4' diphenylmethanediisocyanate isomer is about 10.0 weight percent or less based on the total weight of the polyisocyanate component.

17. The process of claim 16 wherein said polyisocyanate component includes between about 2.0 to about 8.0 weight percent 2,4'-diphenylmethane diisocyanate isomer based on the total weight of polyisocyanate component.

18. A polyurethane foam comprising the reaction product of:
   a) a prepolymer comprising the reaction product of:
      i) a polyisocyanate component consisting of polymethylene polyphenylene polyisocyanates, wherein from 40 to 70 weight percent of said polymethylene polyphenylene polyisocyanates have functionalities greater than 2 and the remainder of said polymethylene polyphenylene polyisocyanates have functionalities of 2 or less; and
      ii) a polyether polyol component having an average hydroxyl equivalent weight of at least about 700 and an average functionality of from 1.6 to 3.0; and
   b) an isocyanate-reactive resin component;
   c) wherein said polyisocyanate component is combined in an amount of from 65 to 90 weight percent based on the total weight of said prepolymer composition with an amount of from 10 to 35 weight percent of said polyether polyol based on the total weight of said prepolymer composition, the prepolymer has an average viscosity of from about 400 to about 2,000 centipoise at 25° C., and the resulting foam has an average density of between about 8.0 and about 20.0 lbs./cu. ft.

19. The polyurethane foam of claim 18 wherein said polyisocyanate component has an average viscosity of between about 160 to 250 centipoise at 25° C.

20. The polyurethane foam of claim 18 wherein said polyisocyanate component is present in an amount of from about 80.0 to about 90.0 weight percent based on the total weight of the prepolymer.

21. The polyurethane foam of claim 18 wherein said prepolymer has an average NCO content of from about 20.0 to about 30.0 weight percent.

22. A method of producing a polyurethane foam comprising the steps of:
   a) providing a prepolymer composition comprising the reaction product of:
      i) a polyisocyanate component consisting of polymethylene polyphenylene polyisocyanates, wherein from 40 to 70 weight percent of said polymethylene polyphenylene polyisocyanates have functionalities greater than 2 and the remainder of said polymethylene polyphenylene polyisocyanates have functionalities of 2 or less; and
      ii) a polyether polyol component having an average hydroxyl equivalent weight of at least about 700 and an average functionality of from 1.6 to 3.0;
   b) wherein said polyisocyanate component is combined in an amount of from 65 to 90 weight percent based on the total weight of said prepolymer composition with an amount of from 10 to 35 weight percent of said polyether polyol based on the total weight of said prepolymer composition, and the prepolymer composition has an average viscosity of between about 400 to about 2,000 centipoise at 25° C.; and
   c) reacting an isocyanate reactive resin component with said prepolymer composition to produce the polyurethane foam.

23. The method of producing a polyurethane foam of claim 22 wherein said polyisocyanate component has an average viscosity of between about 160 to 250 centipoise at 25° C.

24. The method of producing a polyurethane foam of claim 22 wherein said polyisocyanate component is present in an amount of from about 80.0 to about 90.0 weight percent based on the total weight of the prepolymer composition.

25. The method of producing a polyurethane foam of claim 22 wherein said prepolymer has an average NCO content of from about 20 to about 30.0 percent.

26. The prepolymer composition of claim 22 wherein said polyisocyanate component includes one or more isomers selected from the group consisting of 2,4' and 4,4' diphenylmethane diisocyanate isomers, wherein the total amount of 2,4' diphenylmethane diisocyanate isomer is about 10.0 weight percent or less based on the total weight of the polyisocyanate component.

27. The prepolymer composition of claim 26 wherein said polyisocyanate component includes between about 2.0 to about 8.0 weight percent 2,4'-diphenylmethane diisocyanate isomer based on the total weight of polyisocyanate component.

* * * * *